(12) United States Patent
Pereira

(10) Patent No.: US 10,279,446 B2
(45) Date of Patent: May 7, 2019

(54) DRILLING DEVICE WITH AUTOMATIC OR CONTROLLED FEED SPEED WITH SELF-ALIGNING SPINDLE

(71) Applicant: SETI-TEC, Lognes (FR)

(72) Inventor: Sebastien Pereira, Charneca da Caparica (PT)

(73) Assignee: SETI-TEC, Saint Maur des Fosses (FR)

(*) Notice: Subject to any disclaimer, the term of this patent is extended or adjusted under 35 U.S.C. 154(b) by 0 days.

(21) Appl. No.: 15/663,101

(22) Filed: Jul. 28, 2017

(65) Prior Publication Data
US 2018/0029182 A1 Feb. 1, 2018

(30) Foreign Application Priority Data
Jul. 29, 2016 (FR) ...................................... 16 57425

(51) Int. Cl.
*B23Q 15/14* (2006.01)
*B23Q 5/04* (2006.01)
(Continued)

(52) U.S. Cl.
CPC .............. *B23Q 5/043* (2013.01); *B23B 39/14* (2013.01); *B23B 47/00* (2013.01); *B23Q 5/326* (2013.01); *B23Q 5/402* (2013.01); *B23Q 15/14* (2013.01); *B23B 2215/04* (2013.01); *B23B 2270/58* (2013.01)

(58) Field of Classification Search
CPC ......... B23B 39/00; B23B 45/14; B23B 47/28; B23B 49/00; B23B 49/02
See application file for complete search history.

(56) References Cited

U.S. PATENT DOCUMENTS 2,357,579 A * 9/1944 Conway ............... B25H 1/0064
408/111
2,891,427 A * 6/1959 Warsap ................ B23Q 1/5406
408/111
(Continued)

FOREIGN PATENT DOCUMENTS

EP 0187409 A1 7/1986
FR 2555083 A1 * 5/1985 ............ B23P 19/006
(Continued)

OTHER PUBLICATIONS

JP 60-131106 Machine Translation, pp. 4-7, Jun. 20, 2018.*
(Continued)

*Primary Examiner* — Nicole N Ramos
(74) *Attorney, Agent, or Firm* — David D. Brush; Westman, Champlin & Koehler, P.A.

(57) ABSTRACT

A drilling device with automatic or controlled feed speed. The drilling device includes a casing that houses a drilling spindle that is to drive a cutting tool in motion to drill a workpiece having a target surface. The spindle is tiltable inside the casing relative to the axis of the casing. The device has a self-alignment, which self-aligns the spindle relative to the target surface. The self-alignment moves the spindle into a position in which its axis is essentially perpendicular to the target surface under the effect of an application of a thrust force of the drilling device against the target surface essentially along the axis of the casing.

12 Claims, 9 Drawing Sheets

(51) Int. Cl.
  *B23B 39/14* (2006.01)
  *B23Q 5/32* (2006.01)
  *B23B 47/00* (2006.01)
  *B23Q 5/40* (2006.01)

(56) References Cited

U.S. PATENT DOCUMENTS

| | | | | |
|---|---|---|---|---|
| 4,332,066 | A * | 6/1982 | Hailey | B23B 31/08 29/26 R |
| 4,613,262 | A * | 9/1986 | Woods | B23Q 9/0014 408/111 |
| 5,702,212 | A * | 12/1997 | Erath | B23B 51/0027 408/153 |
| 5,765,975 | A * | 6/1998 | Hoffmann | B25J 15/0616 409/138 |
| 5,769,576 | A * | 6/1998 | Gerard | B23C 3/055 408/236 |
| 6,368,012 | B1 * | 4/2002 | St. Onge | B23P 19/102 403/368 |
| 6,877,936 | B2 * | 4/2005 | Linderholm | B23B 41/06 408/1 R |
| 9,249,850 | B2 * | 2/2016 | Kuraya | B25J 15/0019 |
| 2014/0193217 | A1 | 7/2014 | Pereira | |

FOREIGN PATENT DOCUMENTS

| | | | |
|---|---|---|---|
| FR | 2881366 | A1 | 8/2006 |
| FR | 3000693 | A1 | 7/2014 |
| JP | 60131106 | A * | 7/1985 ............ B23B 31/08 |
| WO | 2014054802 | A1 | 4/2014 |
| WO | 2016102392 | A1 | 6/2016 |

OTHER PUBLICATIONS

English translation of the French Written Opinion dated for French Patent Application No. 1657425, filed Jul. 29, 2016.
French Preliminary Search Report dated Mar. 14, 2017 for French Patent Application No. 1657425, filed Jul. 29, 2016.
French Written Opinion dated for French Patent Application No. 1657425, filed Jul. 29, 2016.

* cited by examiner

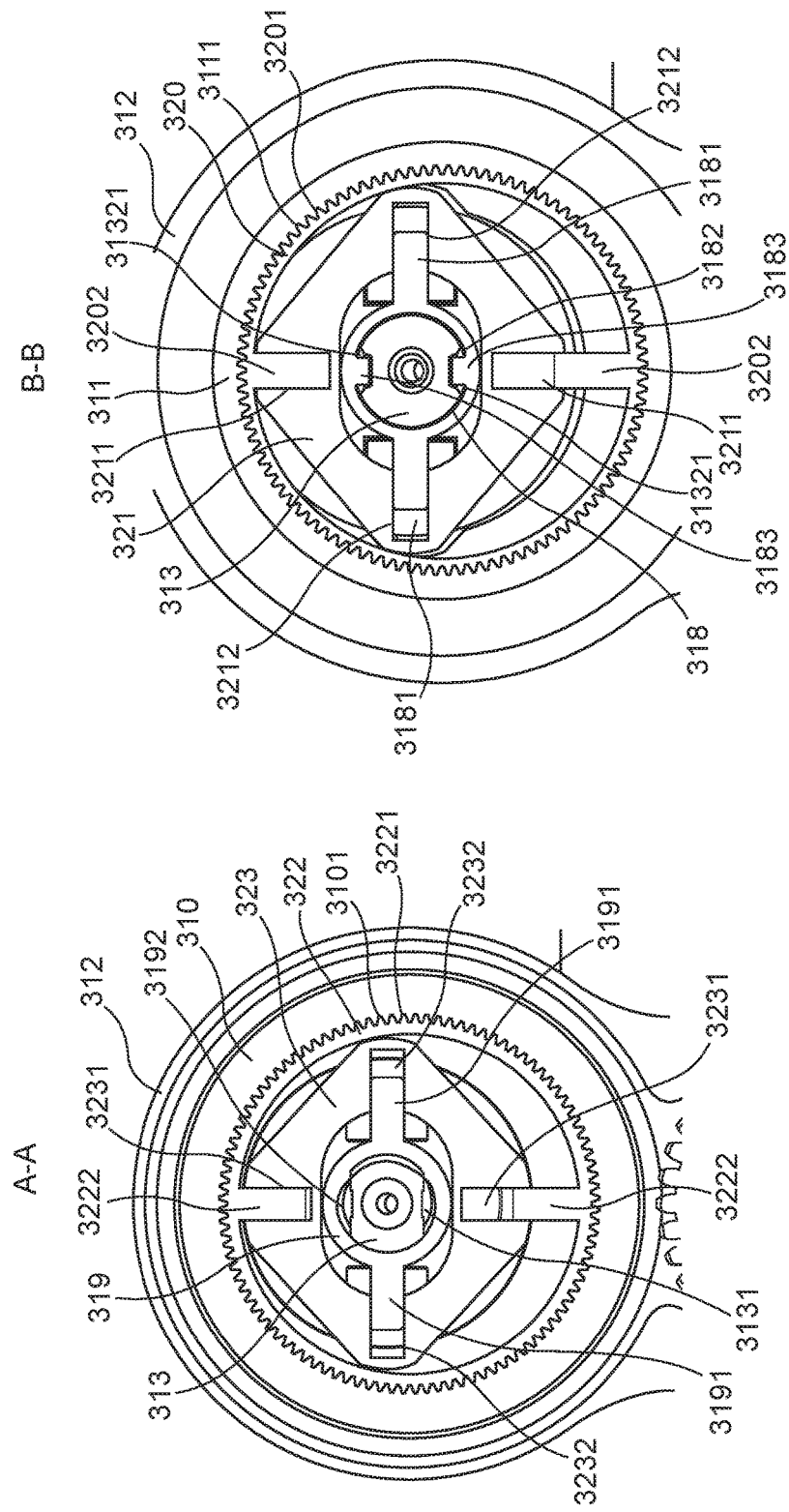

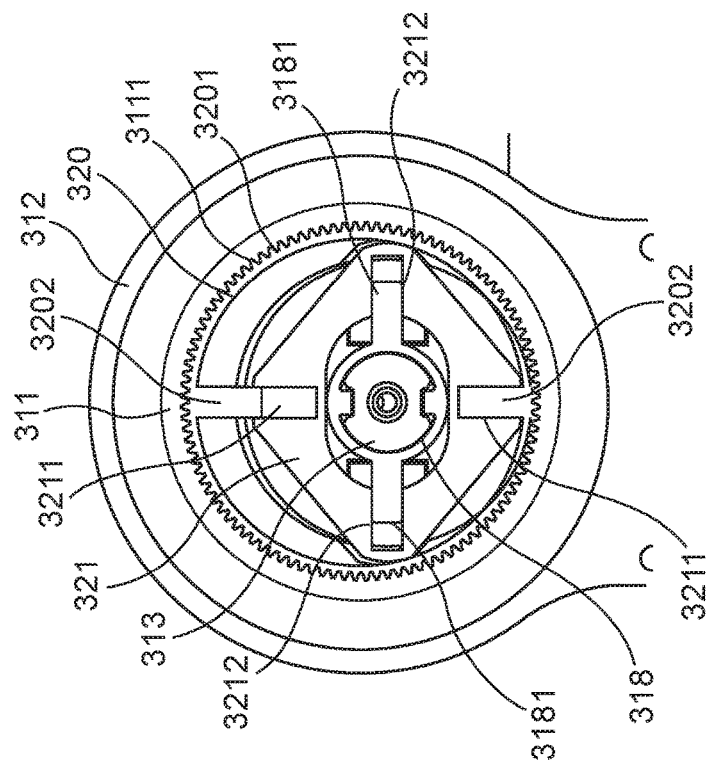
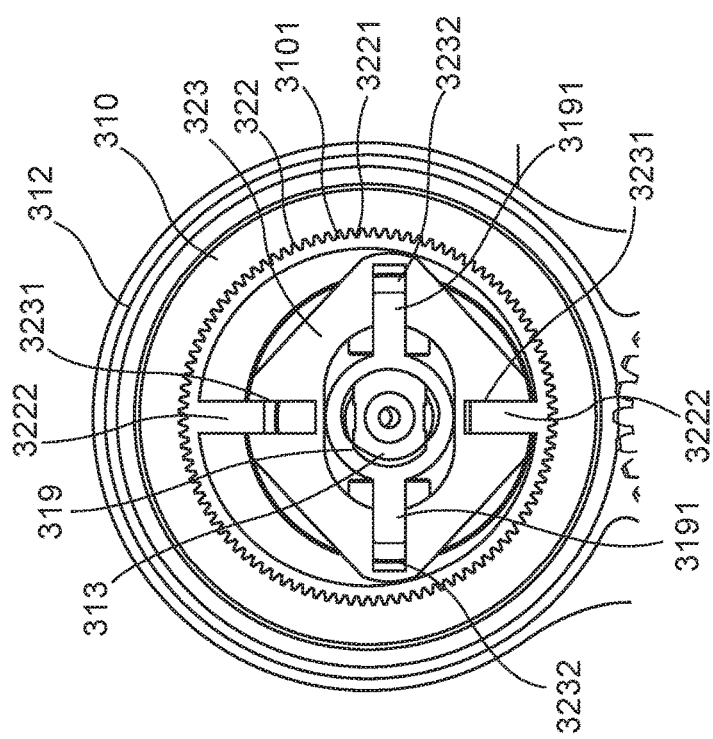

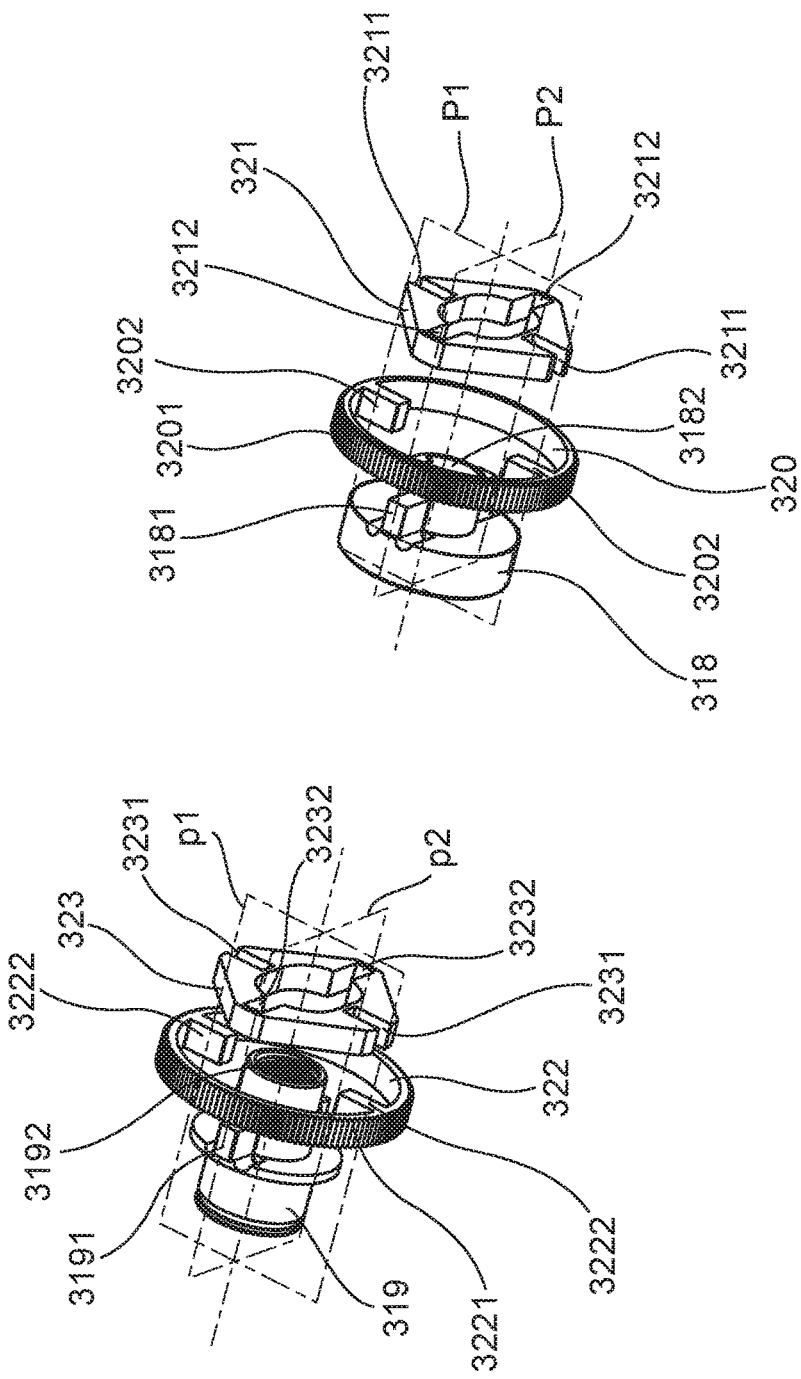

DRILLING DEVICE WITH AUTOMATIC OR CONTROLLED FEED SPEED WITH SELF-ALIGNING SPINDLE

1. FIELD OF THE DISCLOSURE

The field of the disclosure is that of the designing and manufacture of drilling devices more commonly called drills.

More specifically, the disclosure relates to a drilling device or drill with automatic or controlled feed speed.

2. PRIOR ART

There are known drills where the drilling spindle, which is intended for driving a cutting tool, such as a drill bit, in motion, can be driven simultaneously in rotation and in translation along a same axis in order to carry out a drilling operation. Among these drills, there are, on the one hand, drills with automatic feed speed and, on the other hand, drills with controlled feed speed.

Drills with automatic feed speed have a single motor that is used to drive the drilling spindle in both rotation and translation on a same axis. It is then not possible to vary, on the one hand, the rotation frequency and, on the other hand, the feed speed of the drilling spindle.

Drills with controlled feed speed have a motor for effecting rotation that is used to convey a rotational motion to the drilling spindle and a feed motor that is used to convey a feed motion to the drilling spindle (put into a translation motion along its axis of rotation). It is thus possible to vary, on the one hand, the rotation frequency and, on the other hand, the feed speed of the drilling spindle.

These drills are implemented in certain industrial fields, especially in aeronautics for the manufacture of aircraft.

Aircraft comprise a fuselage, housing the cockpit, that provides the link between the wings and the tail section.

The fuselage generally comprises a skeleton structure consisting of a plurality of frames mutually linked by means of stringers and longerons or longitudinal members. Panels are fixedly attached around the skeleton, for example, by screwing or riveting.

When building an aircraft, the panels are attached around the skeleton structure so as to get fixedly attached thereto. Prior to their fixed attachment, bores have to be made through the panels and the skeleton to enable the passage of the fastening elements that provide for their fixed attachment.

These bores are made during counter-drilling stages in which both the panels and the skeleton elements to which they must be fixed are drilled in one and the same operation.

To this end, drilling templates are attached in proximity to the assembly constituted by the skeleton and the panels to be assembled. These drilling templates, through which there pass a plurality of drilling holes, thus form so to speak drilling templates. To make sure that a bore is drilled at a drilling hole on the template, a controlled feed speed drill is fixedly attached to this hole by fixed-attachment means provided for this purpose, such as for example, expandable collars.

During a counter-drilling operation, the drill with controlled feed speed drill is used in such a way that the drilling spindle and the cutting tool that is fixedly attached to it are simultaneously driven in rotation and in translation along one and the same axis. The cutting tool then pierces the panel and then the corresponding skeleton element or performs the reverse operation, depending on whether the drilling template and the drill are situated on the interior or exterior of the fuselage. Automatic return means for the drilling spindle are implemented so that the cutting tool is withdrawn from the bore made and brought back to its initial position at the end of the counter-drilling cycle.

To carry out a new drilling operation, the drill must be shifted by hand to the corresponding drilling hole on the drilling template. The drill is thus shifted by hand by an operator between each drilling operation.

The use of the drilling templates and of the means for affixing the drill to the templates makes it possible firstly to carry out a precise positioning of the drill relative to the structure to be drilled and secondly to rigidly hold the drill during each drilling operation. Thus, it is ensured that the bore drilled is of high precision.

The manual shifting of the drill after each drilling operation is a lengthy and painstaking operation for the operator responsible for it. It therefore tends to impair productivity.

In order to improve the productivity and flexibility of the production means, especially in the aeronautical industry, the use of drilling templates has been replaced by that of drilling robots used to hold the drill in position during drilling and move the drill after each drilling operation.

A drilling robot has a handling or robotic arm having a drill with controlled feed speed attached to its extremity.

The motor, transmission and measurement elements conventionally implemented within a controlled feed speed drill constitute a standard assembly called an effector.

A detachable drilling module, comprising the drilling spindle, the cutting tool as well as elements specific to the module such as, for example, the means for affixing the tool to the drilling spindle, the transmission elements with the appropriate reduction ratios for rotation frequency and feed speed, and a memory containing data (such as service life, cutting speed, feed speed etc.) proper to the tool can be fixedly attached reversibly to the effector.

The fastening and the adjustment of the cutting tool on such a module are generally carried out by the tooling department of a factory. These drilling modules provided when their cutting tool can be stored in a warehouse accessible to the robot in which it can search and automatically change the drilling module so as to carry out the drilling operations assigned to it.

The dimensional tolerance values of the drilled bores are generally very small, especially with regard to the perpendicularity of the bores relative to the surface of the workpiece to be drilled. The perpendicularity flaw of the axis of a bore relative to the drilled surface should generally not be more than 0.5%.

The robot must therefore place the drill perfectly relative to the surface to be drilled so that the axis of the drilling spindle is oriented relative to the surface to be drilled in such a way that the dimensional tolerance values of the bores are complied with.

In order to make sure that the robot appropriately positions the drill relative to the surface to be drilled, the robot takes account of a virtual representation, of the CAD model type, of the structure to be drilled. Using such a representation, the robot is ordered to position, at each drilling operation, the drill at the theoretical location where the tool must be situated in order to carry out the drilling operation.

However, there are dimensional differences between the virtual model, which is only a theoretical representation of reality, and the real structure to be drilled.

Taking such a virtual model into consideration in order to achieve the positioning of the drill by the robot therefore does not making it possible, by itself, to obtain positioning precise enough to comply with dimensional tolerance values, especially with regard to perpendicularity.

In order to overcome this problem, the theoretical positioning of the drill based on the virtual model needs to be corrected.

Several solutions have been developed to carry out such a correction of position.

A first solution, known as correction by surface recognition, consists in:

Evaluating the perpendicularity flaw of the drilling spindle relative to the surface to be drilled; this evaluation can for example consist in scanning the real surface to be drilled by means of three laser sensors, positioned at three points with a difference of 120° between them about the body of the effect and being capable of measuring the distance between each of these three sensors and the surface to be drilled to reconstruct this surface and compute the perpendicularity flaw between this reconstructed surface and the axis of the drilling spindle;

transmitting the pre-computed perpendicularity flaw to the control unit of the robot;

commanding the robot, on the basis of the computed flaw, so as to reposition the drilling spindle relative to the surface to be drilled in such a way that the dimensional tolerance values of perpendicularity are complied with.

Once the correction of positioning has been performed, the drilling cycle can be carried out.

Such a correction is of course carried out as a preliminary to each drilling operation.

A surface recognition correction brings satisfactory results in terms of precision in that it leads to compliance with the dimensional tolerance values. However, it is relatively lengthy to carry out and therefore penalizes productivity, and this is generally unacceptable at the industrial level.

In a second approach, known as correction by self-alignment, the effector to which the drilling module that houses the drilling spindle is fixedly attached is given a small degree of swiveling freedom relative to the arm of the robot along the rotational axis of the spindle and the drill is provided with a supporting surface perpendicular to the axis of the drilling spindle, that is to support the surface to be drilled.

When the robot moves the drill towards the workpiece to be drilled, and when the supporting surface comes into contact with the surface to be drilled and is placed flat against the surface, then the effector housing the drilling pin pivots about the axis of the pivot joint (or spherical swivel link) that connects it to the robot arm to adopt an orientation such that the axis of the drilling spindle is perpendicular to the surface to be drilled. This correction is therefore made within the limits of the freedom of swiveling which can be equal to a few degrees to compensate for the lack of precision of theoretically positioning by the robot.

The advantage of this correction by self-alignment lies in a gain in time because it avoids the phases of measurement, computation and repositioning of the robot that are inherent in the first surface-recognition approach, and procures accurate positioning of the spindle immediately when the robot is moved against the workpiece to be drilled during the drilling cycle.

The drawback of this correction by self-alignment is that, given the weight of the effector and the vibrations to which it is subjected, the forces generated by the robot to place the supporting surface flat against the surface to be drilled and to realign the axis of the spindle relative to the surface to be drilled must be relatively great to ensure that the axis of the spindle extends quite perpendicularly to the surface to be drilled.

Indeed, the exertion of such a force risks giving rise to a marking of the workpiece to be drilled by the supporting surface and even a deformation of the workpiece to be drilled, and this is of course unacceptable.

3. PRESENTATION OF THE INVENTION

An exemplary embodiment of the present disclosure proposes a drilling device with automatic or controlled feed speed, comprising a casing that houses a drilling spindle that is to drive a cutting tool in motion to drill a workpiece comprising a target surface.

According to the an embodiment, said spindle is tiltable inside said casing relative to the axis of said casing, and said device comprises means of self-alignment of said spindle relative to said target surface, said means of self-alignment moving said spindle into a position in which its axis is essentially perpendicular to said target surface under the effect of an application of a thrust force of said drilling device against said target surface essentially along the axis of said casing.

It may be recalled that before the thrust force of the drilling device is exerted against the target surface, the drilling device will have been positioned by the robot in a position facing the location of the bore to be drilled in such a way the axis of its casing is perpendicular to the target surface. This will be so within the limit of the differences between the CAD model and the real components (workpiece to be drilled, drill, robot, positioning of these components relative to each other) as well as the limit of precision of motion of the robot.

An exemplary embodiment relies on an original approach implementing a drilling spindle that is tiltable relative to the casing of the drilling device and means for the self-alignment of the spindle relative to the target surface of the workpiece to be drilled in such a way that, after the drilling device has been placed at the location of the bore to be drilled, the spindle moves in a position in which its axis is essentially perpendicular to the target surface when thrust force of the drilling device is exerted against the target surface essentially along the axis of the casing (in other words, along an axis essentially perpendicular to the target surface).

The term "essentially perpendicular" is understood to mean that the perpendicularity of the spindle is situated in a pre-determined required range of tolerance values, for example of the order of about +/−1.5°.

According to an embodiment, the drill is not tiltable in its totality relative to the robot arm. It is only the drilling spindle that is tiltable inside the casing of the drill. The mass of the parts to be shifted to obtain a self-alignment of the spindle is therefore largely smaller according to an embodiment of the disclosure than it is with the self-aligning technique of the prior art.

Since the thrust force needed for the self-alignment of the spindle is all the weaker as the mass of the parts to be shifted to this end is low, the technique according to an embodiment of the disclosure provides for a satisfactory self-alignment through the application of reduced thrust force.

The fact of having to generate a reduced thrust force to align the spindle also reduces the risk of marking of the workpiece to be drilled as compared with the prior-art technique for correcting position by self-alignment.

The technique according to an embodiment of the disclosure therefore does not have the drawbacks of the techniques for correcting position by surface recognition as it does not entail the use of slow and complicated measuring and computing means.

The technique of the disclosure thus makes it possible to obtain the self-alignment of the spindle relative to the target surface of the workpiece to be drilled in a simple, reliable and speedy way without any risk of marking the workpiece to be drilled.

According to one possible characteristic, said drilling spindle is connected to said casing by means of a pivot link.

The spindle can thus be easily tilted in the casing by making it pivot above the center of the pivot link that connects it to the casing. The center of this pivot link is preferably situated on the rotational axis of the drilling spindle.

According to one possible characteristic, a drilling device according to an embodiment comprises means for driving said spindle in rotation and means for driving said spindle in translation along its axis, said means for driving comprising means permitting the offset of said spindle relative to said casing.

In this case, said means for driving in rotation and said means for driving in translation can each comprise:
- a pinion mounted so as to be mobile in rotation within said casing along the axis of said casing;
- an external driving unit rotationally linked to said pinion along the rotational axis of said pinion;
- an eccentric ring;
- an internal driving unit rotationally linked with said spindle;

the eccentric ring being rotationally linked to said external driving unit along the rotational axis of said pinion and being mobile relative to said external driving unit along a path included in a first plane passing through the rotational axis of said pinion; the eccentric ring being rotationally linked to said internal driving unit along the rotational axis of said spindle and being mobile relative to said internal driving unit along a path included in a second plane passing through the rotational axis of said spindle;
the first and second planes being not parallel.

This implementation allows for a simple and efficient offset of the spindle relative to the casing at the position of the means for driving the spindle in motion.

In this case, the first and second planes are preferably perpendicular.

According to one particular characteristic of the disclosure:
- said means for driving in rotation comprise a rotation nut, said spindle being rotationally linked to said rotation nut and being mobile in translation relative to this nut along the axis of the spindle,
- said means for driving in translation comprising a feed nut, said spindle being linked to said feed nut by a helical link,
- said feed nut and said internal driving unit of said means for driving in translation being rotationally linked;
- said rotation nut and internal driving unit of said means for driving in rotation being rotationally linked.

Putting the rotation nut into rotation causes the drilling spindle to be put into rotation. Putting the feed nut into rotation makes it possible to control the feed speed of the drill spindle.

In this case:
- said feed nut and said internal driving unit of said means for driving in translation can form a single part;
- said rotation nut and the internal driving unit of said means for driving in rotation can form a single part.

This approach simplifies the architecture of the device according to an embodiment by reducing the number of its parts.

According to one possible variant:
- the external driving unit of said means for driving in rotation and said rotation nut respectively comprised two internal fingers and two external fingers that are diametrically opposite to each other, said internal fingers co-operating with the two external grooves of a complementary shape made in said eccentric rotation ring, said external fingers co-operating with two internal grooves of a complementary shape made in said eccentric rotation ring;
- the external driving unit of said means for driving in translation and said feed nut respectively comprise two internal fingers and two external fingers that are diametrically opposite to each other, said internal fingers co-operating with two external grooves of a complementary shape made in said eccentric feed ring, said external fingers co-operating with two internal grooves of a complementary shape made in said eccentric feed ring.

Such an architecture provides for the simple and efficient driving of the drilling spindle in rotation and in translation while enabling it to be tilted in the casing.

According to one possible variant, said external driving units and said corresponding pinions of said means for driving in rotation and said means for driving in translation respectively form a single part.

This approach simplifies the architecture of the device according to an embodiment by reducing the number of parts.

According to one possible variant, a drilling device according to the disclosure comprises a sheath within which said spindle is mounted so as to be mobile in translation and in rotation along its own axis, said sheath being tiltable towards the interior of said casing and comprising, at its extremity turned towards the exterior of said casing, a support surface that is to be applied against said target surface.

According to one possible variant, a drilling device according to the disclosure comprises a detachable drilling module fixedly and reversibly attached to said casing, said drilling module comprising at least said spindle and said means for the self-alignment of said spindle relative to said target surface.

Such a detachable drilling module is interchangeable according to the drilling operation to be performed. It can contain a memory with data proper to the cutting tool fixedly attached to the drilling spindle (data on state of use, feed speed, cutting speed etc) which cannot be taken into account by the command or control unit of the drill to steer or manage the drilling operation.

According to one possible variant, said external driving units and said corresponding pinions of said means for driving in rotation and said means for driving in translation are rotationally linked along the rotational axis of said pinions through ridges made in said pinions and said driving units and are free in translation along the rotational axis of said parts.

This approach makes it possible to simply detach the drilling module from the effector.

The disclosure also relates to a detachable drilling module that is to be fixedly and reversibly attached to a drilling device with controlled feed according to any one of the variants explained here above, said drilling module comprising at least said spindle and said means of self-alignment of said spindle relative to said target surface

4. LIST OF FIGURES

Other features and advances shall appear from the following description of particular embodiments, given by way of simple, illustratory and non-exhaustive examples, and from the appended drawings of which:

Figure 1:
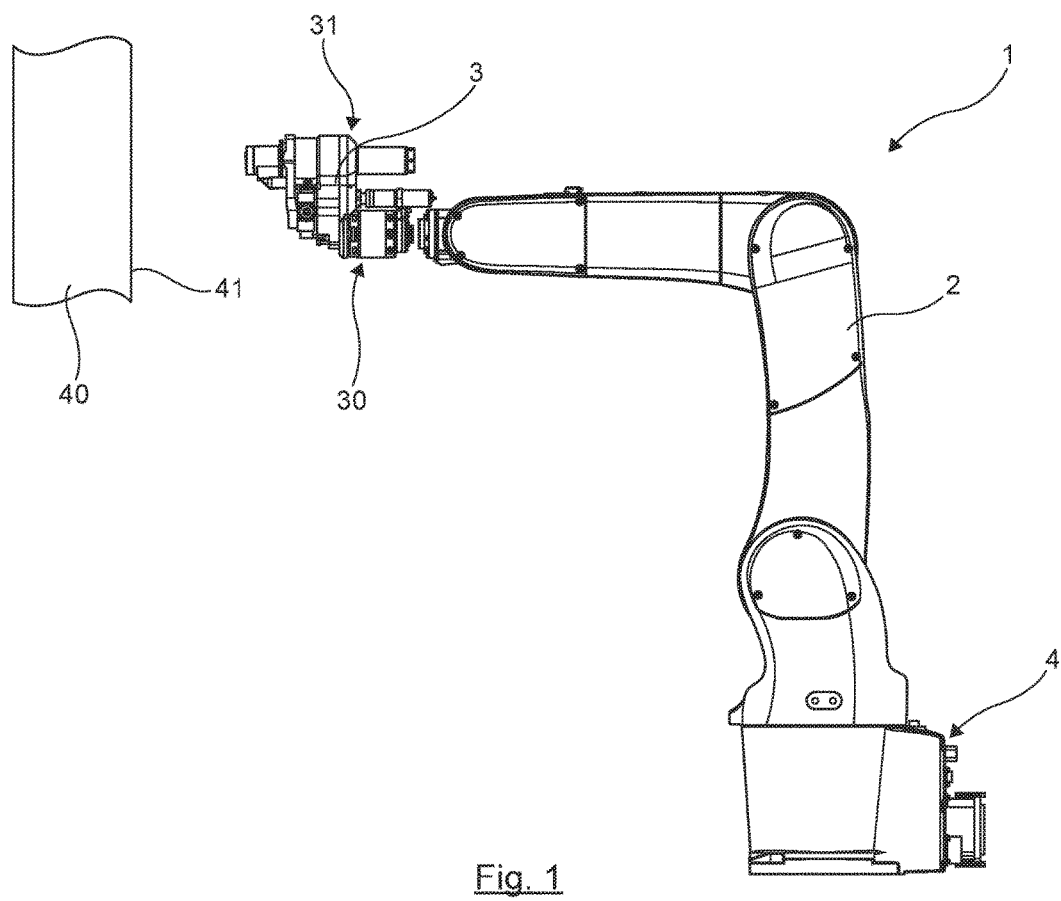
FIG. 1 illustrates a side view of a drilling device according to an embodiment placed at the extremity of a robot's arm.
Figure 2:
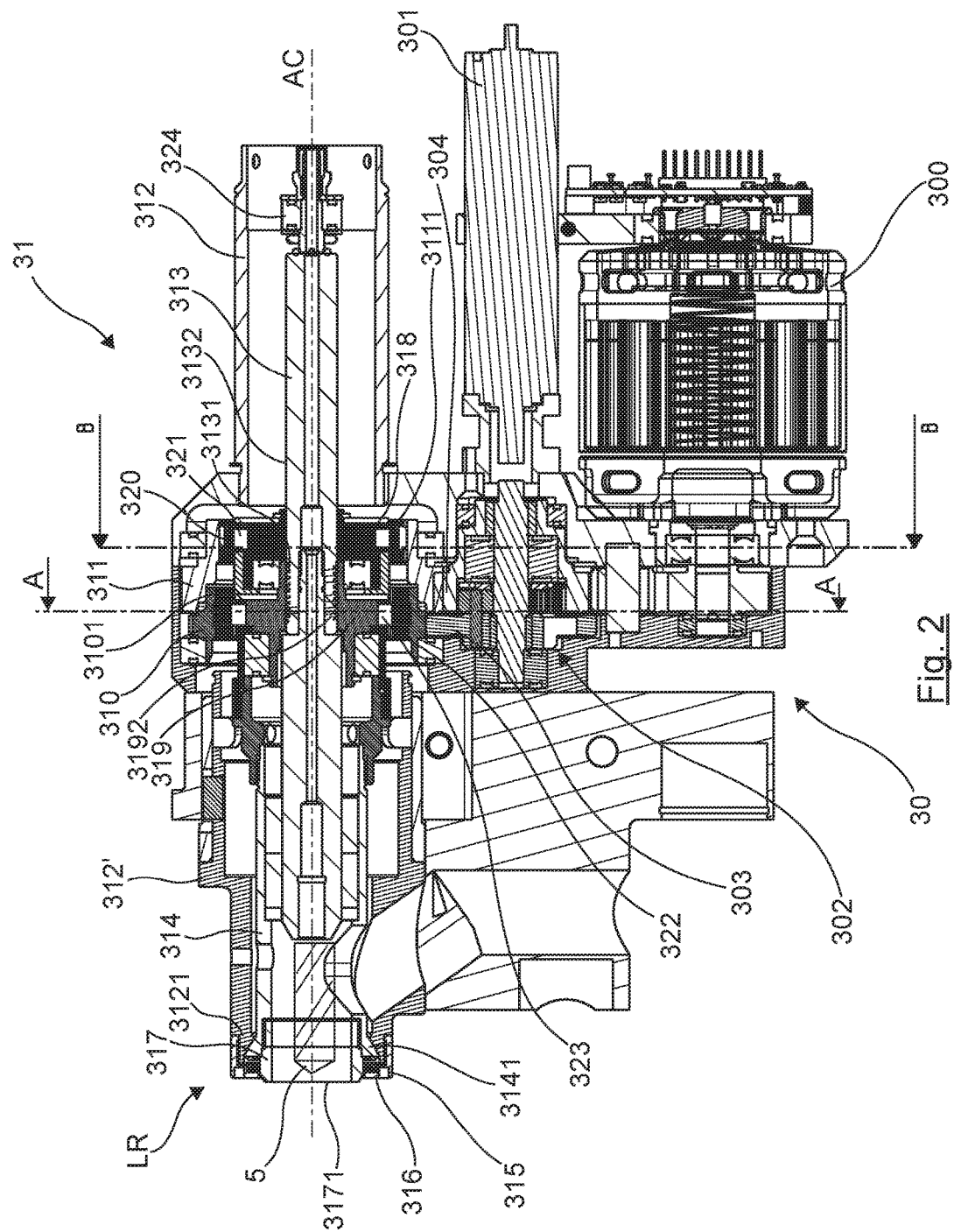
FIG. 2 illustrates a view in longitudinal section of a drilling device according to an embodiment, for which the axis of the spindle is appreciable aligned with the axis of the drill casing.
Figure 3:
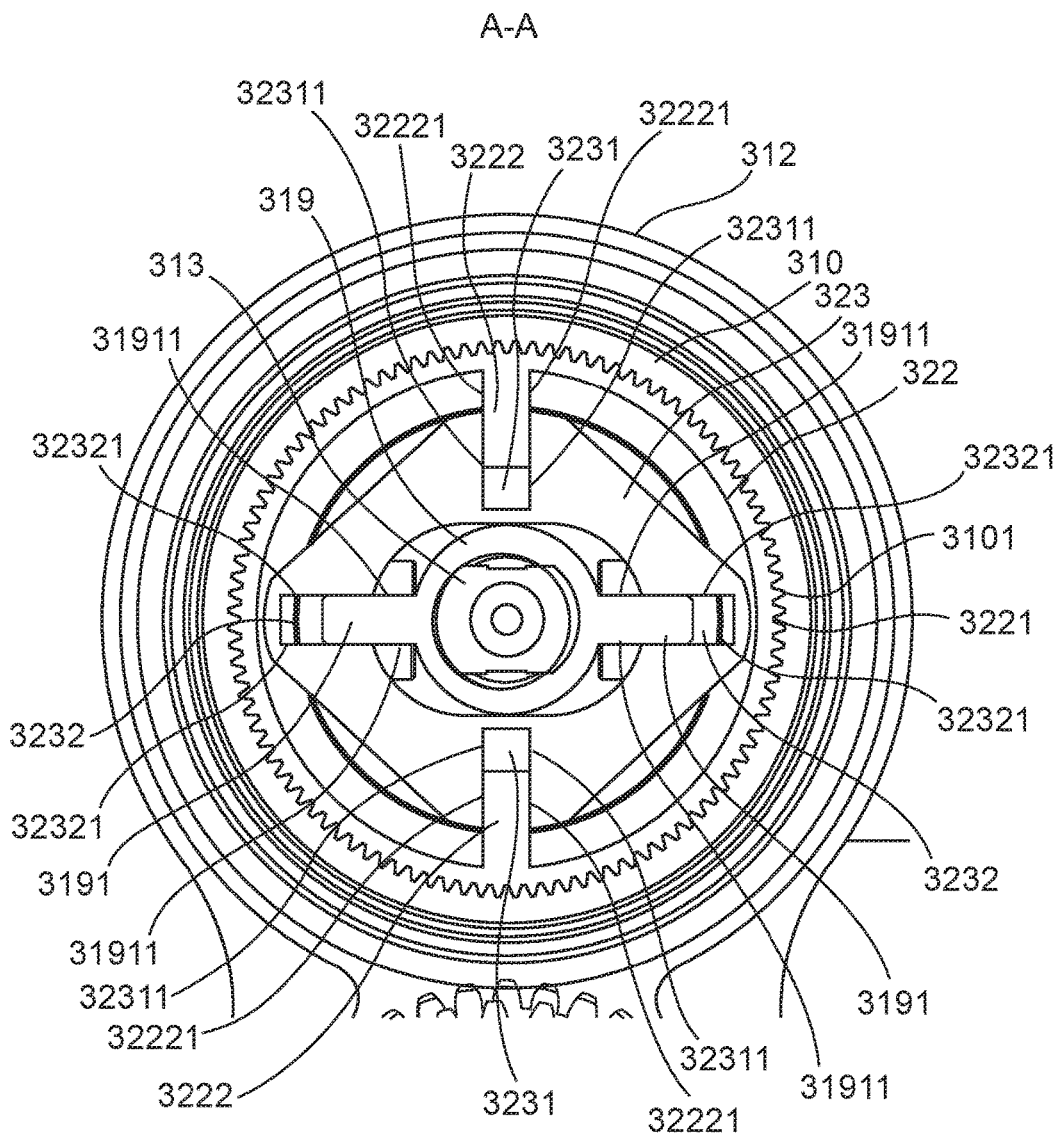
FIGS. 3 and 4 illustrate cross-section views of the drilling device of FIG. 2 along the axes A-A and B-B.
Figure 4:
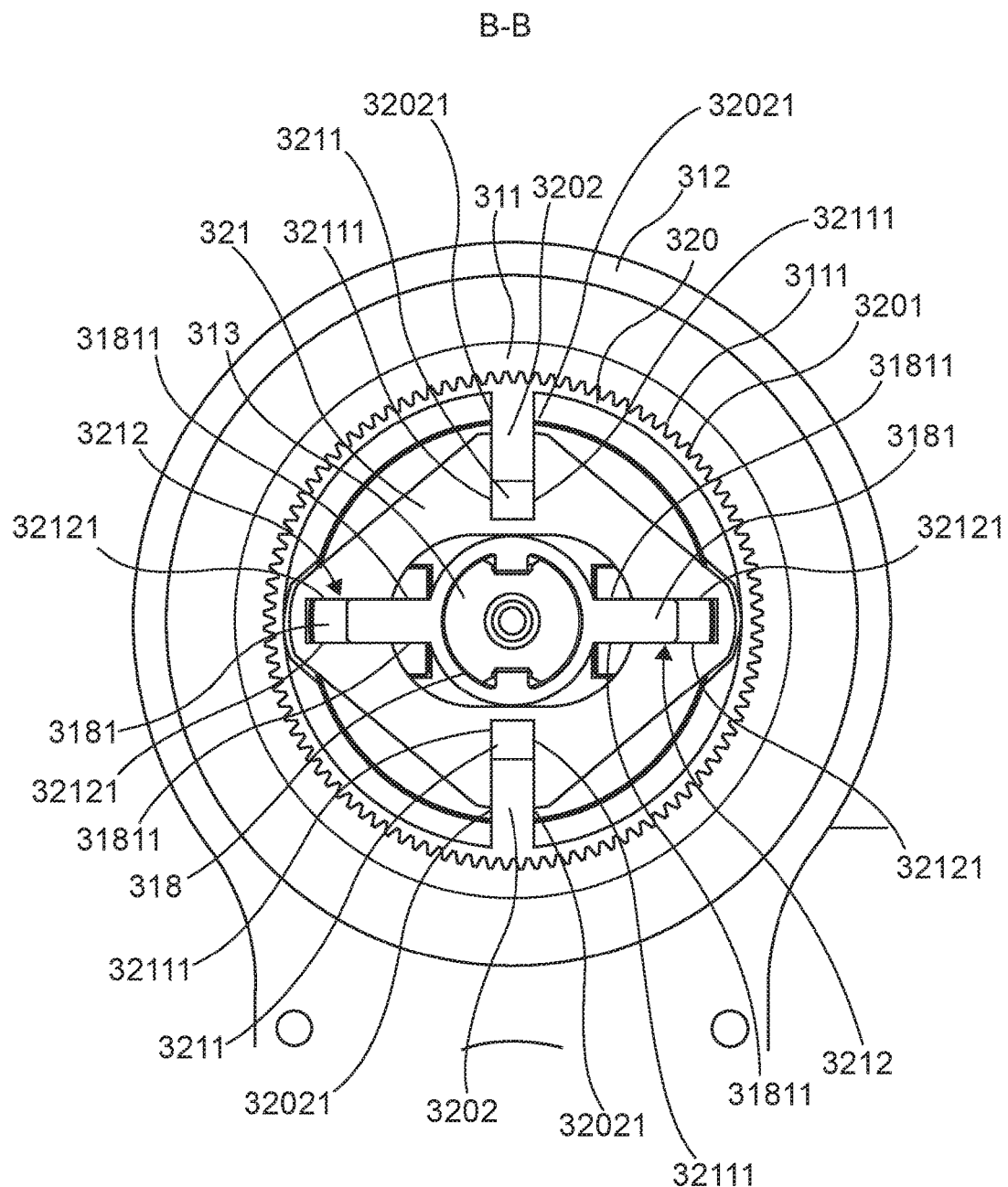
Figure 5:
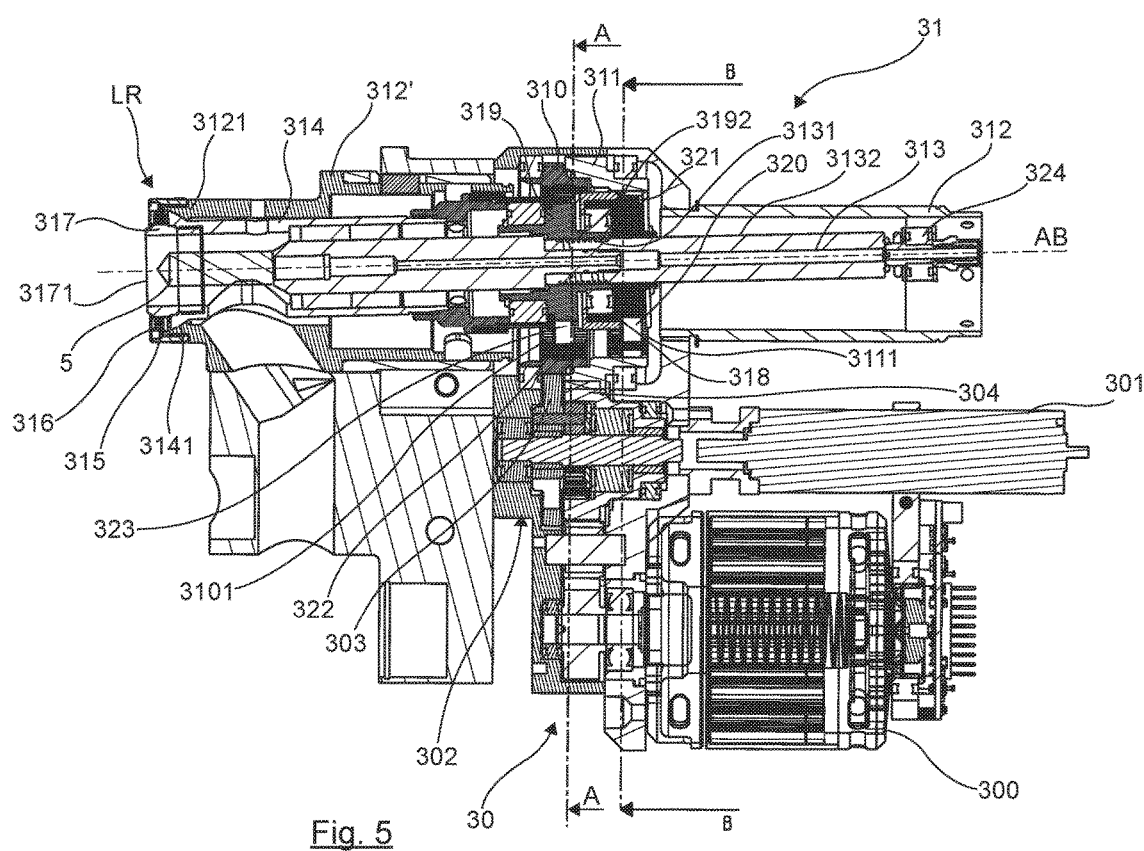
FIG. 5 illustrates a view in longitudinal section of a drilling device according to an embodiment, on which the axis of the drilling spindle is tilted in the interior of the casing of the drill.
Figure 12:
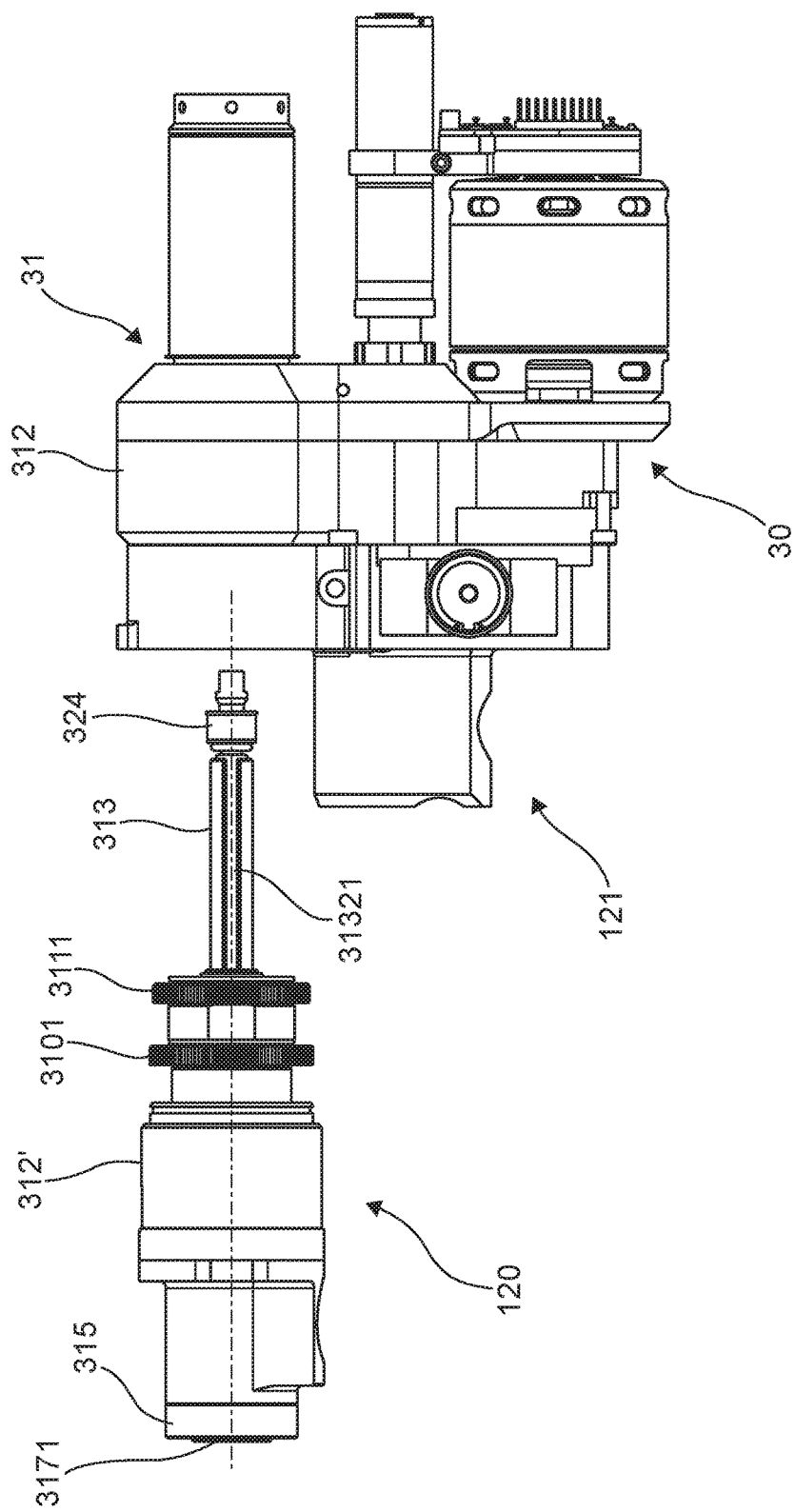

FIGS. 6 and 7 on the one hand and 8 and 9 on the other illustrate views in cross-section of the drilling device of FIG. 2 along the axes A-A and B-B for a spindle having various tilts;

FIGS. 10 and 11 illustrate exploded views of means allowing the offset of the spindle relative to the casing;

FIG. 12 illustrates a drilling module detached from the rest of the drill.

5. DESCRIPTION OF PARTICULAR EMBODIMENTS

5.1. Architecture

Referring now to FIGS. 1 to 12, they present an example of a drilling device with controlled feed speed according to the disclosure.

In this embodiment, such a drilling device comprises a drilling robot 1 comprising a handling arm or robotic arm 2 having a drill 3 with controlled feed speed attached to its extremity. Such a drilling robot 1 classically comprises a control unit 4 capable of steering the robot. Such a control unit is known per se and shall not be described in greater detail.

The drill 3 comprises a transmission unit 30 and a drilling unit 31.

FIG. 2 illustrates a view in section along a plane passing through the axis of the spindle of the drill 3 and through the transmission axes of the transmission unit 30.

The drilling unit 31 comprises a casing 312 which houses a drilling spindle 313 that is to drive the cutting tool 5, such as a drill bit, in motion to drill a workpiece comprising a target surface. The device comprises many means (not shown) for the fixed attachment of a cutting tool to the front extremity of the spindle.

The attacking surface 41 of a workpiece to be drilled 40 is its surface with which the cutting tool comes first into contact during a drilling operation.

The cutting spindle 313 is mounted so as to be mobile in rotation and in translation along its longitudinal axis AB within the casing 312. It is also mounted so as to be tiltable within the casing 312 relative to a longitudinal axis AC of the casing 312 or at least the part of it that houses the drilling spindle 313.

As we see more clearly here below, the drill comprise means of self-alignment of the drilling spindle 313 relative to the target surface, these self-alignment means moving the drilling spindle 313 into a position in which its AB is essentially perpendicular to the target surface under the effect of an application of a force in which the drill is thrust against the target surface essentially along the axis AC of the casing 312.

To be tiltable in the casing 312, the drilling spindle 313 is mounted so as to be mobile in rotation and in translation along its longitudinal axis AB within a sheath 314, this sheath 314 being for its part connected, at its front end, to the casing 312 by a pivot link LR the center of which is on the axis AB of the drilling spindle 313. This pivot link, in this embodiment, permits a tilt of the spindle 313 relative to the casing of the order of +1-1.5° approximately.

The front extremity of the sheath 314 comprises a male peripheral surface in the form of a sphere portion 3141 and the casing 312 comprises a female housing 3121 having an internal surface of complementary shape in which the extremity of the sheath 314 is placed. The front extremity of the sheath 314 is kept in the housing 3121 of the casing 312 by means of a lock-nut 315 and elastic washers 316 interposed between the nut 315 and the front end of the sheath 314.

A supporting part 317 is fixedly attached to the front extremity of the sheath 314 for example by screwing. This supporting part 317 comprises a supporting surface 3171 that is perpendicular to the longitudinal axis AB of the drilling spindle 313. This supporting surface 3171 forms a projection at the front extremity of the casing 312. In other words, it goes beyond the front extremity of the casing 312. As shall be explained in greater detail here below, this supporting surface 3171 is meant to take support against the target surface of a workpiece to be drilled during a drilling phase. The supporting part 317 will be preferably made out of a material that is soft enough not to mark the workpiece to be drilled and hard enough not to agglomerate shavings during drilling that could subsequently mark the workpiece to be drilled. This material could especially be an aluminum alloy.

The drill comprises means for the driving the drilling spindle 313 in rotation and means for driving the drilling spindle 313 in translation along the longitudinal axis AB of this spindle.

To allow a tilting of the spindle within the casing, these means for driving in rotation and in translation comprise, as shall be seen more clearly here below in the description, means enabling the offset of the drilling spindle relative to the casing 312.

The means for driving in rotation comprise a rotation nut 318. The spindle 313 is rotationally linked to the rotation nut 318 and mobile in translation relative to this nut along the axis AB of the drilling spindle 313.

To this end, a ridged portion 3132, the ridges 3132& of which extend along the longitudinal axis AB of the drilling spindle 313, is made on the drilling spindle 313. The rotation nut 318 comprises an internal passage 3182, the outline of which, comprising grooves 3183, has a shape complementary to that of the external outline of the grooved portion 3132 of the drilling spindle 313. The rotation nut 318 and the grooved portion 3132 are joined in a sliding assembly.

The means for driving in translation comprise a feed nut 319. The drilling spindle 313 is linked to the feed nut 319 by a helical link. To this end, the drilling spindle 313 comprises a threaded portion 3131 and the feed nut comprises a tapped internal passage 3192 of a shape that is complementary to that of the threaded portion 3131.

The means for driving in rotation also comprise:
- a rotational pinion 311 mounted so as to be mobile in rotation within the casing 312 along the axis AC of the casing 312;
- an external driving unit 320 rotationally linked to the rotational pinion 311 along the rotational axis of the rotational pinion 311: to this end, the rotational pinion 311 comprises a ridged internal passage 3111 designed to house the external driving unit 320, the external outline 3201 of which is ridged and has a shape complementary to that of the internal passage 3111;
- an eccentric ring 321;
- an internal driving unit rotationally linked with the drilling spindle 313: in this embodiment, the internal driving unit and the rotational nut 318 constitute one and the same part (they can constitute two parts rotationally linked along the axis of the spindle).

This eccentric ring 321 is rotationally linked to the external driving unit 320 along the rotational axis of the rotational pinion 311 and is mobile relative to the external driving unit 320 along a path included in a first plane P1 essentially parallel to the axis of rotation of the rotational pinion 311.

The eccentric ring 321 is also rotationally linked to the internal driving unit (i.e. the rotation nut 318 in the present embodiment) along the rotational axis of the rotation spindle 313 and is mobile relative to the internal driving unit (i.e. the rotation nut 318 in the present embodiment) along a path included in a second plane P2 that is essentially parallel to the axis of rotation of the drilling spindle 313.

In this embodiment, the first P1 and second P2 planes are not parallel but perpendicular.

The means for driving in translation also comprise:
- a translation pinion 310 mounted so as to be mobile in rotation inside the casing 312 along the axis of the casing 312;
- an external driving unit 322 rotationally linked to the translation pinion 310 along the rotational axis of the translation pinion 310: to this end, the translation pinion 310 comprises a ridged internal passage 3101 designed to house the external driving unit 322, the external outline 3221 which is ridged and has a shape complementary to that of internal passage 3101 (in one variant, they could be linked by an embedding or they could form one and the same part);
- an eccentric ring 323;
- an internal driving unit rotationally linked with the drilling spindle 313: in this embodiment, the internal driving unit and the translation nut 319 constitute one and the same part (they can form two parts rotationally linked along the axis of the spindle).

This eccentric ring 323 is rotationally linked to the external driving unit 322 along the rotational axis of the translation pinion 310 and is mobile relative to the external driving unit 322 along a path included in a first plane p1 that is essentially parallel to the rotational axis of the translation pinion.

The eccentric ring 323 is rotationally linked to the internal driving unit (i.e. the translation nut 319 in the present embodiment) along the rotational axis of the drilling spindle 313 and is mobile relative to the internal driving unit (i.e. the translation nut 319 in the present embodiment) along a path included in a second plane p2 that is essentially parallel to the rotation axis of the drilling spindle 313.

In this embodiment, the first p1 and the second p2 planes are not parallel but are perpendicular.

The external driving unit 320 of the rotational driving means and the rotation nut 318 respectively comprise two internal fingers 3202 and two external fingers 3181 that are diametrically opposite to each other. The internal fingers 3202 co-operate with two external grooves 3111 of a complementary shape made in the eccentric rotation ring 321. The external fingers 3181 co-operate with two internal grooves 3212 of a complementary shape made in said eccentric rotation ring 321.

The external grooves 3211 comprise two opposite guide surfaces 32111 that extend in planes essentially parallel to the rotational axis of the rotation pinion 311.

The internal fingers 3202 comprise two opposite guide surfaces 32021 that extend in planes essentially parallel to the rotation axis of the rotation pinion 311.

The internal grooves 3212 comprise two opposite guide surfaces 32121 that extend in planes essentially parallel to the rotation axis of the drilling spindle 313.

The external fingers 3181 comprise two opposite guide surfaces 31811 that extend in planes essentially parallel to the rotation axis of the drilling spindle 313.

The grooves 3211 can shift relative to the fingers 3202 in a plane parallel to their respective guide surfaces. The grooves 3211 and the finger 3202 rotationally link the external driving unit 320 to the eccentric ring 321. The fingers 3181 can move in the grooves 3212 in a plane parallel to their respective guide surfaces. The grooves 3212 and the fingers 3181 rotationally link the internal driving unit 318 to the eccentric ring 321. The fingers 3181 can move in the grooves 3212 in a plane parallel to their respective guide surfaces. The grooves 3212 and the fingers 3181 rotationally link the internal driving unit 318 with the eccentric ring 321.

The external driving unit 322 of the means for driving in translation and the feed nut 319 respectively comprise two internal fingers 3222 and two external fingers 3191 that are diametrically opposite. The internal fingers 3222 co-operate with two external grooves 3231 of complementary shapes made in the off-centering feed ring 323. The external fingers 3191 co-operate with two internal grooves 3232 of a complementary shape made in the eccentric feed ring 323.

The external grooves 3231 comprise two opposite guide surfaces 32311 that extend in planes essentially parallel to the rotation axis of the translation pinion 310.

The internal fingers 3222 comprise two opposite guide surface 32221 that extend in planes essentially parallel to the rotational axis of the translation pinion 310.

The internal grooves 3232 comprise two opposite guide surfaces 32321 that extend in planes essentially parallel to the rotational axis of the driving spindle 313.

The external fingers 3191 comprise two opposite guide surfaces 31911 that extend in planes essentially parallel to the rotation axis of the drilling spindle 313.

The grooves 3231 can shift relatively to the fingers 3222 in a plane parallel to their respective guide surfaces. The grooves 3231 and the fingers 3222 rotationally link the external driving unit 3222 to the eccentric ring 323. The fingers 3191 can move in the grooves 3232 in a plane parallel to their respective guide surfaces. The grooves 3232 and the fingers 3191 rotationally link the internal driving unit 319 to the eccentric ring 323.

The first and the second planes of the means for driving in rotation are not necessarily identical to the first and second planes of the means for driving in translation.

The drill comprises an adjustable stop 324 to adjust the drilling depth.

In this embodiment, the sheath 314 is fixedly attached to a detachable casing portion 312' that can be separated from the rest of the casing 312.

The assembly formed by the casing 312', the sheath 314, the supporting part 317, the drilling spindle 313, the stop 324, the rotation nut 318 and feed nut 319, the internal driving unit, the eccentric rings 321, 323 and the external driving units 320, 322 form a detachable drilling module 120 that can be fixedly and reversibly attached to the rest of the drill 121 and is interchangeable. The grooves of the external driving units enable easy assembly of the drilling module with the rest of the drill. These grooves can be beveled to further facilitate the positioning. A system for steering the feed and rotation motors to enable alternating motion of the feed pinions and the rotation pinions when positioning the drilling module will facilitate the setting up of the module.

Means of reversible attachment are used to detachably attach the drilling module to the rest of the drill.

In one variant, no detachable drilling module is implemented, and the components of this module are integrated non-detachably into the drill. In this case, the rotation pinion and the feed pinion can form a single part with the corresponding external driving unit.

The transmission unit 30 is the type of transmission unit that is conventionally implemented in a drill with controlled feed speed. It can especially be a transmission unit of the type described in the patent application FR3000693. Such a transmission unit 30 classically comprises a rotating motor 300, a feed motor 301, the shafts which are connected to a transmission 302 which comprises especially a first output pinion 303 and a second output pinion 304.

The feed pinion 310 is engaged with the first output pinion 303 of the transmission unit 30 while the rotation pinion 311 is engaged with the second output pinion 304 of the transmission unit 30.

In the embodiment described here, the axes of the feed motor 301 and the rotating motor 300 are parallel to the drilling spindle. In some variance, one motor or these motors could have the axis of their shaft perpendicular to that of the drilling spindle.

5.2. Operation

To carry out the drilling of a workpiece to be drilled at a given place on this workpiece, the drilling robot is steered so as to place the drill with controlled feed speed at the desired place, using a virtual CAO type representation of the workpiece to be drilled.

Once the drill is brought to this place, the axis of the casing that houses the drilling spindle extends essentially perpendicularly to the target surface of the workpiece to be drilled. The drill is kept in this position rigidly and reliably by the robot arm.

The relative perpendicularity of the axis of the housing in relation to the target surface introduced by the notion of the "essentially parallel" relates especially to differences between the CAD model and the real components (workpiece to be drilled, drill, robot, relative positioning of these components with each other) as well as the limit of precision of the robot's motion.

The robot is then managed so as to move the drill towards the target surface along the axis of the casing, i.e. along an axis essentially perpendicular to the target surface.

During this movement, the supporting surface 3171 of the supporting part 317 comes into contact with the target surface 41. Under the effect of the force conveyed by the robot arm in a direction essentially perpendicular to the target surface, the drilling spindle 313 pivots inside the casing 312 about the center of the pivot link LR and is tilted therein until it occupies a position in which the axis of the drilling spindle 313 extends perpendicularly to the target surface.

Naturally, during the phase of self-alignment, the drilling spindle is retracted within the sheath so that the tip of the drill bit 5 which is fixedly joined to it cannot go beyond the contact surface 3171 but shifts towards the interior of the casing.

The tilt of this spindle within the casing is allowed by a movement of the eccentric rotation and translation rings relative to the corresponding external driving unit, and of the internal rotation and translation driving units relative to the corresponding eccentric rings. The spindle as well as the rotation and feed nuts are then offset relative to the feed and rotation pinions. This can be seen for example in FIGS. 2, 3, 6, 7, 8 and 9.

A self-alignment is thus obtained of the axis of the spindle relative to the target surface of the workpiece to be drilled.

The force for placing the drill firmly against the workpiece to be drilled, needed to obtain an appropriate self-alignment, depends especially on:
- the weight and dynamic effects being exerted on the spindle and its sheath (these dynamic effects are all the smaller as the mass of the parts to be moved to obtain alignment of the drill spindle is low: the lower these forces, the smaller is the force to be deployed for firmly placing the spindle;
- the diameter of the supporting part 317: the greater this diameter, the smaller is the force needed for firmly placing the spindle;
- radial efforts in transmission between the drilling spindle and the above-mentioned means for driving in rotation and translation.

This force for firmly placing the spindle will be determined experimentally using the contradictory goals of positioning the spindle (appropriate and stable self-alignment) and of not marking the workpiece to be drilled.

Self-alignment is obtained at the beginning of each drilling operation.

The drilling operation can then classically continue by driving the feed motor 301 and the rotational motor 300 so as to control the rotation frequency and feed speed of the drilling spindle.

5.3. Variants

Means can be implemented to guarantee that the force for firmly placing the spindle will remain within a predetermined range of values to ensure appropriate and stable self-alignment without in any way thereby marking the workpiece to be drilled.

By way of an example, such means could for example comprise:
- a regulation system that measures the force for firmly placing the spindle, exerted and corrected as required, by acting on the motor means of the robot;
- a slide link system provided with elastic elements integrated between the drilling module and the rest of the drilling device;
- a thruster or jack integrated between the drilling module and the rest of the drilling device accompanied by a system used to measure the placing force and to regulate the jack to keep it within the range of tolerance values.

Such means can also be used to compensate for the variation in the force for firmly placing the spindle, that can result from vibrations and/or expansion of the parts by heating during a drilling operation.

A device for locking the pivot joint in position after the spindle has found its orientation can be envisaged to hold it reliably in position.

The embodiment described here above relates to the implementing of aspects of the disclosure within a drilling device with controlled feed speed. However, the these aspects can equally well be implemented within a drilling device with automatic feed speed. In this case, the transmission unit implemented would be that of a drilling device with automatic feed speed as described in the document FR2881366.

In the present document, the expression "plane passing through an axis" does not mean that the plane cuts the axis but that the plane contains the axis.

An exemplary embodiment of the present disclosure is aimed especially at providing an efficient solution to at least some of these different problems.

An exemplary embodiment provides a drilling device, the drilling spindle of which can be easily and speedily aligned in a reliable way with the target surface of a workpiece to be drilled.

An exemplary embodiment provides such a drilling device that provides for the self-alignment of the drilling spindle while limiting the risks of marking the workpiece to be drilled.

The invention claimed is:

1. A drilling device with automatic or controlled feed speed, comprising:
    a casing that houses a drilling spindle configured to drive a cutting tool in motion to drill a workpiece comprising a target surface, wherein said spindle has a longitudinal axis that is tiltable inside said casing relative to a longitudinal axis of said casing;
    means of self-alignment of said spindle relative to said target surface, said means of self-alignment being configured to move said spindle, when the longitudinal axis of the spindle is not perpendicular to said target surface, into a position in which the longitudinal axis of the spindle is perpendicular to said target surface under the effect of an application of a thrust force of said drilling device against said target surface along the longitudinal axis of said casing;
    means for driving said spindle in rotation; and
    means for driving said spindle in translation along its axis, said means for driving in translation comprising means permitting offset of said spindle relative to said casing.

2. The drilling device according to claim 1 wherein said drilling spindle is connected to said casing by a pivot link.

3. The drilling device according to claim 1, wherein said means for driving in rotation and said means for driving in translation each comprise:
    a pinion mounted so as to be mobile in rotation within said casing along the axis of said casing;
    an external driving unit rotationally linked to said pinion along a rotational axis of said pinion;
    an eccentric ring;
    an internal driving unit rotationally linked with said spindle;
        the eccentric ring being rotationally linked to said external driving unit along the rotational axis of said pinion and being mobile relative to said external driving unit along a path included in a first plane passing through the rotational axis of said pinion;
        the eccentric ring being rotationally linked to said internal driving unit along a rotational axis of said spindle and being mobile relative to said internal driving unit along a path included in a second plane passing through the rotational axis of said spindle; the first and second planes being not parallel.

4. The drilling device according to claim 3, wherein the first and second planes are perpendicular.

5. The drilling device according to claim 3, wherein:
    said means for driving in rotation comprise a rotation nut, said spindle being rotationally linked to said rotation nut and being mobile in translation relative to this nut along the longitudinal axis of the spindle,
    said means for driving in translation comprising a feed nut, said spindle being linked to said feed nut by a helical link;
    said feed nut and said internal driving unit of said means for driving in translation being rotationally linked;
    said rotation nut and the internal driving unit of said means for driving in rotation being rotationally linked.

6. The drilling device according to claim 5 wherein:
    said feed nut and said internal driving unit of said means for driving in translation form a single part;
    said rotation nut and the internal driving unit of said means for driving in rotation form a single part.

7. The drilling device according to claim 6 wherein:
    the external driving unit of said means for driving in rotation and said rotation nut respectively comprise two internal fingers and two external fingers that are diametrically opposite to each other, said internal fingers co-operating with the two external grooves of a complementary shape made in said eccentric rotation ring, said external fingers co-operating with two internal grooves of a complementary shape made in said eccentric rotation ring;
    the external driving unit of said means for driving in translation and said feed nut respectively comprise two internal fingers and two external fingers that are diametrically opposite to each other, said internal fingers co-operating with two external grooves of a complementary shape made in said eccentric feed ring, said external fingers co-operating with two internal grooves of a complementary shape made in said eccentric feed ring.

8. The drilling device according to claim 1, comprising a sheath within which said spindle is mounted so as to be mobile in translation and in rotation along the longitudinal axis of said spindle, said sheath being tiltable towards the interior of said casing and comprising, at its extremity turned towards the exterior of said casing, a support surface that is to be applied against said target surface.

9. The drilling device according to claim 1, comprising a detachable drilling module fixedly and removably attached to said casing, said drilling module comprising at least said spindle and said means for the self-alignment of said spindle relative to said target surface.

10. The drilling device according to claim 3, wherein said external driving units and said corresponding pinions of said means for driving in rotation and of said means for driving in translation are rotationally linked along the rotational axis of said pinions through ridges made in said pinions and said driving units and are free in translation along the rotational axis of said pinions.

11. A detachable drilling module that is configured to be fixedly and removably attached to a drilling device with automatic or controlled feed, said drilling module comprising:
    a detachable casing;

a drilling spindle attached to the detachable casing configured to drive a cutting tool in motion to drill a workpiece comprising a target surface, wherein said spindle has a longitudinal axis that is tiltable relative to a longitudinal axis of said casing; and means of self-alignment of said spindle relative to said target surface, said means of self-alignment being configured to move said spindle, when the longitudinal axis of the spindle is not perpendicular to said target surface, into a position in which its axis is perpendicular to said target surface under the effect of an application of a thrust force of said drilling device against said target surface along the longitudinal axis of said casing.

12. A drilling device with automatic or controlled feed speed, comprising:

a casing that houses a drilling spindle configured to drive a cutting tool in motion to drill a workpiece comprising a target surface, wherein said spindle has a longitudinal axis that is tiltable inside said casing relative to a longitudinal axis of said casing;

means of self-alignment of said spindle relative to said target surface, said means of self-alignment being configured to move said spindle, when the longitudinal axis of the spindle is not perpendicular to said target surface, into a position in which the longitudinal axis of the spindle is perpendicular to said target surface under the effect of an application of a thrust force of said drilling device against said target surface along the longitudinal axis of said casing;

means for driving said spindle in rotation; and means for driving said spindle in translation along its axis, said means for driving in translation comprising means permitting offset of said spindle relative to said casing;

wherein said means for driving in rotation and said means for driving in translation each comprise:

a pinion mounted so as to be mobile in rotation within said casing along the axis of said casing;

an external driving unit rotationally linked to said pinion along a rotational axis of said pinion;

an eccentric ring;

an internal driving unit rotationally linked with said spindle;

the eccentric ring being rotationally linked to said external driving unit along the rotational axis of said pinion and being mobile relative to said external driving unit along a path included in a first plane passing through the rotational axis of said pinion;

the eccentric ring being rotationally linked to said internal driving unit along a rotational axis of said spindle and being mobile relative to said internal driving unit along a path included in a second plane passing through the rotational axis of said spindle;

the first and second planes being not parallel.

\* \* \* \* \*